(12) United States Patent
Maltsev et al.

(10) Patent No.: US 7,286,609 B2
(45) Date of Patent: Oct. 23, 2007

(54) ADAPTIVE MULTICARRIER WIRELESS COMMUNICATION SYSTEM, APPARATUS AND ASSOCIATED METHODS

(75) Inventors: Alexander A. Maltsev, Nizhny Novgorod (RU); Ali S. Sadri, San Diego, CA (US); Alexey E. Rubtsov, Nizhny Novgorod (RU); Sergey A. Tiraspolsky, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 731 days.

(21) Appl. No.: 10/738,689

(22) Filed: Dec. 16, 2003

(65) Prior Publication Data
US 2005/0031047 A1 Feb. 10, 2005

Related U.S. Application Data

(60) Provisional application No. 60/493,937, filed on Aug. 8, 2003.

(51) Int. Cl.
*H04B 7/02* (2006.01)
*H04B 1/00* (2006.01)
*H04L 1/02* (2006.01)

(52) U.S. Cl. .................................. 375/267; 375/130
(58) Field of Classification Search ............... 375/260, 375/267, 130
See application file for complete search history.

(56) References Cited

U.S. PATENT DOCUMENTS 6,430,441 B1  8/2002  Levine

2003/0043732 A1  3/2003  Walton et al.
2003/0083703 A1  5/2003  Zhu et al.
2003/0139196 A1*  7/2003  Medvedev et al. ......... 455/522
2003/0204210 A1  10/2003  Ousdigian et al.

(Continued)

FOREIGN PATENT DOCUMENTS

EP  1 240 918 A2  9/2002

(Continued)

OTHER PUBLICATIONS

Bangerter, B. et al., "High-Throughput Wireless LAN Air Interface", Intel Technology Journal, 7(3), http://developer.intel.com/technology/itj/index.htm, (Aug. 19, 2003), pp. 47-57.*

(Continued)

*Primary Examiner*—David C. Payne
*Assistant Examiner*—Aslan Ettehadieh
(74) *Attorney, Agent, or Firm*—The Law Offices of John C. Scott; John C. Scott (57) ABSTRACT

An adaptive multicarrier wireless communication system, apparatus and associated methods are generally disclosed herein. In at least one embodiment, channel state information is used to perform bit loading and power allocation within a multicarrier system. In an example technique, after active subcarriers have been identified for a multicarrier channel and an initial power distribution has been made, a subset of active subcarriers may be found that exceed a channel quality performance threshold. Excess power may then be identified by determining how much power could be reduced in the identified subcarriers so that they still meet, but do not exceed the channel quality performance threshold. In one possible approach, the excess power may be re-allocated to other subcarrier subsets.

36 Claims, 4 Drawing Sheets

U.S. PATENT DOCUMENTS

2003/0208241 A1    11/2003   Bradley et al.
2005/0152465 A1     7/2005   Maltsev et al.

FOREIGN PATENT DOCUMENTS

| EP | 1411647 A2 | 8/2003 |
|---|---|---|
| WO | WO 03/001702 A1 | 1/2003 |
| WO | WO 2004/047354 A1 | 6/2004 |
| WO | WO 2005/067171 A1 | 7/2005 |
| WO | WO 2005/071912 A1 | 8/2005 |
| WO | WO 2005/122515 A1 | 12/2005 |

OTHER PUBLICATIONS

Yih et al., "Adaptive Modulation Power Allocation and Control for OFDM Wireless Networks", The 11th IEEE Int'l Symp. on Personal, Indoor and Mobile Radio Communication, 2, Sep. 18, 2000, 809-813.

Li Zhen et al: A modified suboptimum adaptive bit and power allocation algorithm in wideband OFDM system—Canadian conference on electrical and computer engineering—vlo. vol. 3 of 3, May 4, 2003—pp. 1589-1592.

Chi-Hsiao Yih et al: Adaptive modulation, power allocation and control for OFDM wireless networks—Personal, indoor and mobile radio communications—vol. 2 Sep. 18, 2000 pp. 809-813.

Leke A et al: A maximum rate loading algorithm for discrete multitone modulation systems—IEEE Global Telecommunications Conference, vol. 3, Nov. 3, 1997—pp. 1514-1518.

PCT Search Report Dated Nov. 25, 2004.

* cited by examiner

ADAPTIVE MULTICARRIER WIRELESS COMMUNICATION SYSTEM, APPARATUS AND ASSOCIATED METHODS

CROSS-REFERENCE TO RELATED APPLICATION

The present application claims the benefit of U.S. Provisional Application Ser. No. 60/493,937, filed Aug. 8, 2003, entitled "A HIGH-THROUGHPUT WIRELESS NETWORK ARCHITECTURE, APPARATUS AND ASSOCIATED METHODS". In addition, the present invention claims priority to related application Ser. No. 10/330,675 filed Dec. 30, 2002 by Sadri, et al, entitled "SYSTEM AND METHOD FOR INTELLIGENT TRANSMITTED POWER CONTROL SCHEME", the disclosure of which is expressly incorporated herein by reference.

TECHNICAL FIELD

Embodiments of the present invention are generally directed to wireless communication systems and, more particularly, to an adaptive multiple carrier (multicarrier herein) wireless communication system, apparatus and associated methods employing, for example, one or more of adaptive bit loading and power allocation technique(s).

BACKGROUND

A multicarrier communication system such as, e.g., Orthogonal Frequency Division Multiplexing (OFDM), Discrete Multi-tone (DMT) and the like, is typically characterized by a frequency band associated with a communication channel being divided into a number of smaller sub-bands (subcarriers herein). Communication of information (e.g., data, audio, video, etc.) between stations in a multicarrier communication system is performed by dividing the informational content into multiple pieces (e.g., symbols), and then transmitting the pieces in parallel via a number of the separate subcarriers. When the symbol period transmitted through a subcarrier is longer than a maximum multipath delay in the channel, the effect of intersymbol interference may be significantly reduced.

By simultaneously transmitting content through a number of subcarriers within the channel, multicarrier communication systems offer much promise for high-throughput wireless applications. Conventional techniques for increasing system throughput, i.e., the amount of content the channel can carry at any given time, emphasize the identification and exploitation of "good" subcarriers (e.g., those that offer a threshold data rate at or above a threshold performance characteristic (e.g., signal to noise ratio SNR)) over "bad" subcarriers, which are deactivated. The remaining, active subcarriers, are then processed to reach an "optimal" Shannon "water-filling" solution. Such conventional techniques are typically computationally expensive and do not provide a commensurate improvement in system throughput.

BRIEF DESCRIPTION OF THE DRAWINGS

Embodiments of the present invention are illustrated by way of example, and not by way of limitation, in the figures of the accompanying drawings in which like reference numerals refer to similar elements and in which.

DETAILED DESCRIPTION

Embodiments of a system, apparatus and associated methods to provide an adaptive multicarrier wireless communication system are generally introduced herein. In this regard, according to but one example embodiment of the teachings of the present invention, an adaptive subcarrier management agent (SMA) is introduced to adaptively modify one or more of a bit loading and distribution, coding type, modulation type and/or power allocation among "good" and "bad" subcarriers based, at least in part, on received or perceived channel state information. The term bit loading is generally understood by artisans to mean the selective allocation of informational content to a plurality of data streams, the encoding of the content, and the mapping of the encoded content to a select one of a number modulation schemes, although the invention is not limited in this regard. When the additional step of power distribution among the streams is performed, the process is recognized as one of constellation shaping.

As developed more fully below, the innovative subcarrier management agent (SMA) introduced herein may employ traditional Shannon water-filling technique(s) for an initial determination of active subcarriers, bit loading among those subcarriers and power allocation among the active subcarriers. Subsequently, the number of subcarriers in each of a number of subsets are adaptively determined in an effort to maintain a given level of performance within each of the subsets as measured by one or more channel quality metric(s). According to one example implementation, the SMA may reallocate power from higher performing subcarriers (so-called "good" subcarriers) for use in lower performing subcarriers (so-called "bad" subcarriers), and may even re-activate subcarriers which were initially deactivated (e.g., turned off). In this way, the introduction of the SMA employing the disclosed bit and power loading (BPL) technique(s) effectively enables a higher data rate for a given performance metric than could otherwise be attained using conventional techniques.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

EXAMPLE NETWORK ENVIRONMENT

Figure 1:
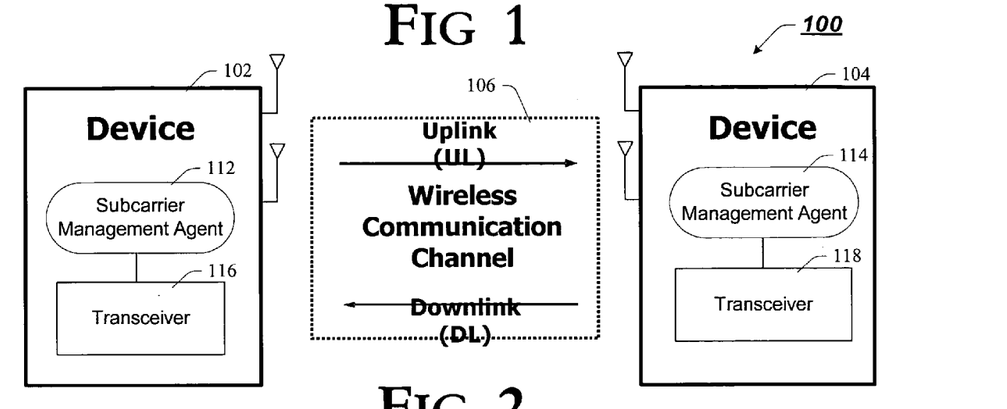
FIG. 1 is a block diagram of an example multicarrier wireless network incorporating the teachings of the present invention, according to one example implementation.

Referring now to FIG. 1, an example wireless communication environment 100 in which the teachings of the present invention may be practiced is presented, according to one example embodiment of the invention. As shown, network 100 is depicted comprising two or more electronic devices 102, 104 are selectively coupled in wireless communication through a communication channel 106 established between transceivers 116, 118 associated with the devices. In accordance with the teachings of the present invention, introduced above, devices 102, 104 each depict an embodiment of a subcarrier management agent (SMA) 112, 114, respectively, to implement an adaptive bit loading and power control technique(s) in an effort to guarantee a fixed quality performance metric in each of a plurality of subsets of subcarriers.

As used herein, transceivers 116, 118 may include a combination of transmitter and receiver functionality, and may well include one or more transmitter circuits and/or receiver circuit(s), although the invention is not limited in this regard. Transceivers 116, 118 are coupled with one or more antenna(e), which may provide one or both devices 102, 104 with spatial divisional multiple access (SDMA) (or, beamforming) or multiple input, multiple output (MIMO) system characteristics. As used herein, transceivers 116, 118 are intended to represent any of a wide range of multicarrier wireless communication transceivers including, for example, transceivers suitable for use within communication networks compliant with the Institute for Electrical and Electronics Engineers (IEEE), e.g., 802.11 task group "n" (colloquially referred to as 802.11n), 802.15 task group "3a" (802.15.3a), and the like, the enhanced data-rates for GSM evolution (EDGE) specification, and/or the third-generation partnership project (3GPP) specification, although the invention is not limited in this regard. According to one example implementation, transceivers 116, 118 may employ Orthogonal Frequency Division Multiplexing (OFDM), introduced above.

Those skilled in the art will appreciate that the characteristics of the communication channel 106 are commensurate with the type of wireless transceiver 116, 118 employed by the devices (102, 104) to establish the channel. Thus, according to one example implementation, transceivers 116, 118 may selectively establish one or more OFDM wireless communication channels, e.g., channel 106, which may include one or more of an uplink component and a downlink component, at least one of which is comprised of a number of subcarriers. As used herein, the established wireless communication channel 106 facilitates the wireless exchange of information between the two devices 102, 104. Such information may include one or more of payload content (audio, video, data, etc.) as well as control content (e.g., channel state information, etc.).

In addition to the traditional notions of an uplink component and a downlink component carrying payload content, devices 102, 104 may exchange channel state information (CSI) via one or more communication paths (not particularly denoted) including, but not limited to, an in-band communication path (e.g., embedded within the communication channel 106), an out-of-band wireless communication path, or a wireline communication path.

As introduced above, electronic devices 102, 104 are depicted comprising an embodiment of a subcarrier management agent (SMA) 112, 114. As used herein, the SMA (112, 114) works in cooperation with at least a transmitter and/or a receiver element of a transceiver (116, 118) to selectively and dynamically control any one or more of a number of channel processing parameters of the transmitter and/or receiver. According to one embodiment, the channel processing parameters may include one or more of the bit loading, coding type, modulation type and/or power allocation among individual ones of at least a subset of the subcarriers comprising multicarrier communication channel 106. According to one example embodiment, SMA 112, 114 initiates this adaptive control of the channel processing parameter(s) of the transceiver in response to received or perceived channel state information.

According to one embodiment, before information transmitting SMA (112, 114) may dynamically determine which of the plurality of subcarriers to use in the channel (plurality of active subcarriers) and calculate one or more of the bit loading, coding type, modulation type and/or power allocation among individual ones of at least a subset of the subcarriers based, at least in part, on the channel state information. As developed more fully below, SMA 112, 114 performs this adaptive bit loading and power redistribution among the subcarriers to effect a given channel quality metric, while improving overall channel throughput. In this regard, according to one embodiment, SMA 112 and 114 may employ a bit and power loading algorithm (BPLA) to adaptively and dynamically control one or more of bit loading and power allocation to exploit not only the "good" subcarriers, but also one or more select "bad" subcarriers. By improving the RATE of lower-order subcarriers, or reactivating subcarriers that were initially identified as "bad" subcarriers and deactivated during the previous information transmitting, SMA 112, 114 effectively increases the overall throughput of the communication channel.

The distinct reference numbers associated with SMA 112, 114 used herein are merely intended to denote that the implementation of SMA need not be exactly the same in each of the devices 102, 104. Indeed, in one embodiment, SMA 112 is depicted as being integrated within transceiver 116, while SMA 114 is merely coupled to an associated one or more transceiver(s) 118. Thus, it should be apparent that SMA's of varying complexity and implementation, which nonetheless perform at least the claimed invention, are anticipated within the scope and spirit of the present invention.

EXAMPLE SMA ARCHITECTURE

Figure 2:
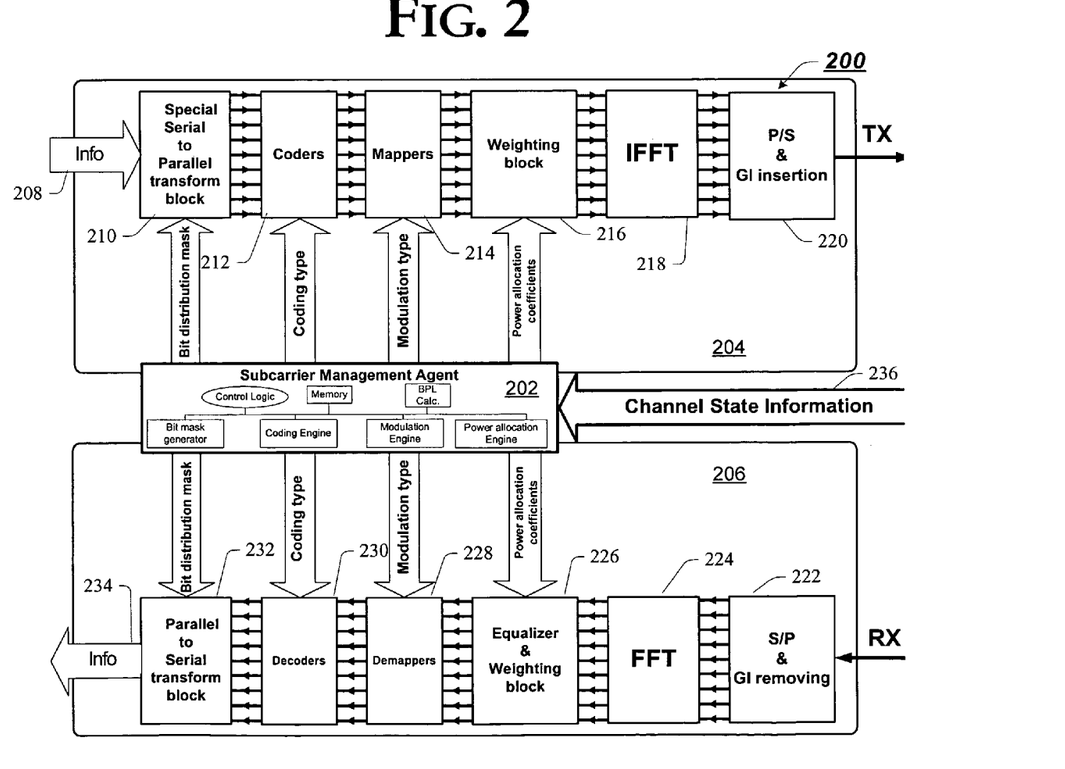
FIG. 2 is a block diagram of an example transceiver incorporating the teachings of the present invention, according to one example implementation.

Turning briefly to FIG. 2, a block diagram of an example subcarrier management agent (SMA) architecture 200 is introduced, according to one embodiment of the invention. For ease of description and clarity, subcarrier management agent (SMA) 202 is depicted functionally coupled with certain elements of a transmitter 204 and/or a receiver 206, although the invention is not limited in this regard. As used herein, SMA 200 may well be implemented in device 102 as SMA 112 and/or SMA 104 as device 114, although other embodiments of the SMA may well be used.

Within the context of FIG. 2, example SMA 202 is depicted comprising one or more of a control element, a bit and power loading (BPL) calculator, a bit mask generator, a coding engine, a modulation engine, a power allocation engine, and associated memory facilities, although the invention is not limited in this regard. It should be appreciated that in alternate embodiments, one or more elements of SMA 202 may well be combined, removed, or split among several functional elements without deviating from the scope and spirit of the present invention. As used herein, one or more elements of the SMA 202 may well be implemented in one or more of hardware, software, firmware and/or a combination thereof.

According to one embodiment, SMA 202 may selectively control one or more channel processing features of an associated transmitter 204 and/or receiver 206 based, at least in part, on received or perceived channel state information (CSI) 236 to improve channel throughput (e.g., measured in terms of data rate, etc.) at a given channel quality performance threshold. According to one embodiment, SMA 202 may receive channel state information (CSI) 236 from a remote device, or perceive channel state information (CSI) via a local receiver.

As used herein, CSI 236 may well comprise one or more of a channel transfer function, or estimate thereof, one or more radio frequency (RF) signal characteristics, and/or one or more channel quality parameters. That is, CSI 236 may include a channel transfer function estimate in the frequency or time domain. CSI 236 may include one or more radio frequency (RF) channel performance indicators such as, e.g., signal to noise ratio (SNR), signal-to-interference and noise ratio (SINR), a received signal strength indication (RSSI), and the like. CSI 236 may well include one or more channel quality parameters associated with information decoded from a received signal such as, for example, a bit error rate (BER), a packet error rate (PER), a symbol error rate (SER), and the like. CSI 236 may include one or more channel processing parameters (e.g., the bit loading, coding type, modulation type and/or power allocation), calculated by the SMA of remote device. According to one embodiment, CSI 236 is associated with one or more prior transmissions via the channel 106.

As developed more fully below, the transceivers 116, 118 in devices 102, 104 may well initially establish a wireless communication channel 106 as a result of the initial transmission(s). SMA 202 may receive channel state information (CSI) 236 from a remote receiver, or as perceived by a local receiver (206). SMA manages the subcarriers of the multicarrier channel using one or more conventional water-filling techniques for initial determination of "bad" subcarriers, which are deactivated (turned-off), and power allocation among the remaining (good) subcarriers. The remaining subcarriers (i.e., the good subcarriers) are initially divided into subsets for processing in accordance with a select coding and modulation type, with a certain power value being applied to each of the subcarriers in each of the fixed subsets, in accordance with given channel quality performance thresholds.

To improve channel throughput SMA 202 may selectively modify the channel processing performed in the associated transmitter (204) and/or receiver (206) while meeting a target channel quality threshold. In this regard, according to one example embodiment, in each of the subsets of subcarriers comprising the multicarrier channel 106, subcarriers are appointed, e.g., according to a combination of modulation and encoding type (referred to herein as RATE combinations, or subcarrier subsets), and the rescaling of subcarrier powers is performed. The number of subcarriers in each RATE subset is adaptively determined, although the scope of the invention is not limited in this regard.

As developed more fully below, in rescaling of subcarrier powers, SMA 202 may redistribute some power from higher RATE subsets for use in lower RATE subsets, and/or for reactivating subcarriers that were deactivated during the initial water-filling process. According to one example implementation, SMA 202 may invoke a power allocation feature of SMA 202 which dynamically generates a number of weight coefficients, applied to one or more of a corresponding plurality of data streams to control effective power applied to a given data stream. According to one example embodiment, the power allocation performed by SMA 202 may be constrained to comply with various peak power and/or power spectral density requirements arising from regulatory agencies, system design constraints, and the like.

Briefly, transmitter 204 of FIG. 2 is depicted comprising one or more of a serial to parallel transform block 210, one or more coders 212, mapper(s) 214, weighting block(s) 216, inverse fast Fourier transform (IFFT) element(s) 218, and a parallel-to-serial transform and GI insertion element, 220 to generate an output (TX) signal, although the invention is not limited in this regard. According to one example implementation, transmitter 204 receives information at the serial-to-parallel transform block 210 where the received information is transformed into a number of parallel information streams. According to one embodiment, the transformation of the information into parallel substreams is performed in accordance with a bit mask received from a bit mask generator within SMA 202.

The plurality of substreams may then be passed through one or more coders 212, mappers 214 and then a weighting block, before being processed by the inverse fast-Fourier transform block 218. Any of a number of encoding techniques may be dynamically applied, before the encoded content is passed through mapper(s) 214, wherein an appropriate modulation technique is applied to the content. According to one embodiment, any one or more of BPSK, QPSK, 8-PSK, 16 QAM, 64 QAM, 128 QAM, 256 QAM, and the like, modulation techniques may be used, although the invention is not limited in this regard. Similarly, any of a number of encoding rates, e.g., $\frac{1}{2}$, $\frac{2}{3}$, $\frac{3}{4}$., $\frac{5}{6}$, $\frac{7}{8}$, 1 and the like may well be used. The output of IFFT 218 is passed through a parallel-to-serial converter block 220 to generate an output signal, where a cyclic prefix or guard interval (GI) may be applied in accordance with an OFDM system, although the invention is not limited in this regard. Elements of the output signal may be directed to a select one or more antenna(e) (not particularly denoted) for transmission as an element (uplink or downlink) of a wireless communication channel.

According to one example embodiment, SMA 202 may selectively control of one or more of the bit mask, coding type and/or modulation type effectively controls the bit loading of the transmitter across individual subcarriers, and subsets thereof. More specifically, as developed more fully below, SMA 202 may generate one or more of a bit mask, coding control content, mapper control content and/or power allocation coefficients (or, weights) to one or more of serial to parallel transform block 210, coder(s) 212, mapper(s) 214 and/or weighting block 216 to adaptively control the bit loading and power allocation among individual subcarriers to effect a given performance metric (e.g., BER, PER, etc.) across the subcarriers.

As shown, receiver 206 may receive a wireless signal, e.g., via communication channel 106, and process the signal to generate a representation 234 of information embedded within the received multicarrier signal 106. In this regard, receiver 204 is depicted comprising one or more of serial-to-parallel converter and GI removal element(s) 222, fast Fourier transform (FFT) element(s) 224, equalizer and weighting element(s) 226, demapper(s) 228, decoder(s) 230 and parallel-to-serial transform element(s) 232 to generate a representation 234 of information embedded within the received signal.

In accordance with the illustrated example embodiment, the signal received by receiver 206 is a multicarrier, e.g., OFDM, signal. According to one example implementation developed more fully below, one or more element(s) of receiver 206 receive control content (e.g., bit distribution mask, coding type, modulation type and/or power allocation coefficients) from the SMA 202 to control one or more processing characteristics (e.g., demodulation, decoding, etc.) of individual ones of the received subcarriers.

According to one example implementation, one or more of parallel-to-serial transform block 232, decoder(s) 230, demapper(s) 228 and/or weighting block 226 may receive control content from SMA 202 to adaptively control the recovery of content from individual subcarriers to effect a given quality metric (e.g., BER, PER, etc.) across the subcarriers. According to one example embodiment, the control content provided by SMA 202 to one or more element(s) 226-232 of receiver 206 is commensurate with the control content provided to the transmit element. According to one embodiment, the transmit 204 and receive 206 elements may support multiple disparate communication channels, wherein the control content provided to the transmitter and receiver is appropriate for each of the given communication channels.

Thus, according to one example embodiment introduced above and developed more fully below, SMA 202 may adaptively modify one or more of a bit distribution mask, a coding type, a modulation type, and/or power allocation coefficients applied to one or more elements of an associated transmitter and/or receiver, as shown, to improve the channel throughput while guaranteeing certain performance thresholds. The detail of how these modifications are made, and which elements of the SMA 202 may perform such processes is described more fully below, with reference to FIGS. 3-7.

EXAMPLE SMA OPERATION

Figure 3:
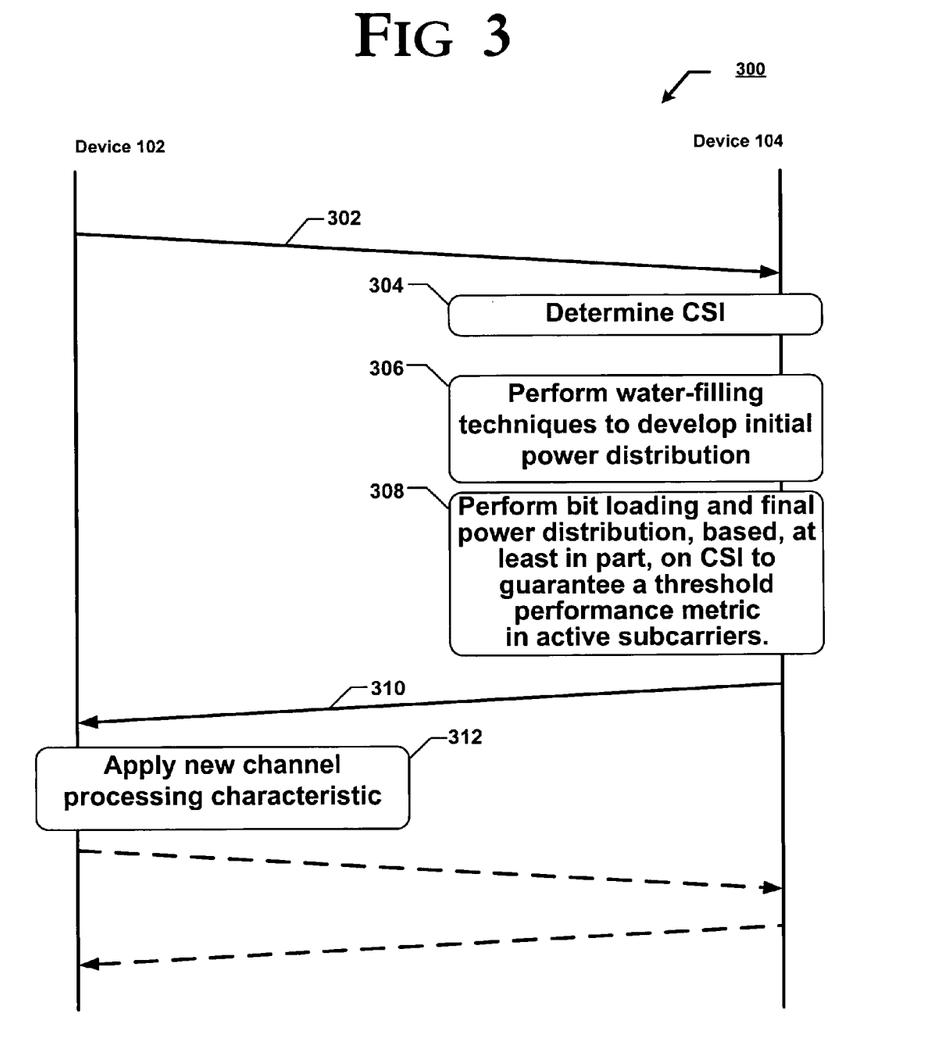
FIG. 3 is a communication flow diagram illustrating a method for improving system throughput in a multicarrier wireless communication channel, according to one example embodiment of the invention.

Turning to FIG. 3, a communication flow diagram 300 between multiple electronic devices (e.g., 102, 104) illustrating an example method for improving channel throughput in a multicarrier wireless communication system is presented, according to one example embodiment. As used herein, characteristics of the communication channel may well include one or more of subcarrier power gains $\lambda_i = |H_i|^2$, where $H_i$ is the channel transfer function for the $i^{th}$ subcarrier, subcarrier noise powers $\sigma^2_{n,i}$, and the like.

According to one embodiment, these values may be used by SMA 202 in the determination of an optimal power allocation $P_i$ (where $P_i$ is the power allocated to the $i^{th}$ subcarrier, and $P_{total}$ is assumed to be constant) through subcarriers at the transmitter side under a criterion of data rate (or, channel throughput) maximization for a given channel quality performance metric (e.g., BER) at the receiver side of the channel, although the invention is not limited in this regard.

As shown, the process begins with one device (e.g., device 102) transmitting information 302 to a remote device (e.g., device 104). According to one example embodiment, this initial transmission may well be performed during, or as an element of, an initial handshake between devices 102, 104, although the invention is not so limited. For example, this initial transmission may comprise an element of an request to transmit (RTS)/clear to transmit (CTS) type of exchange, wherein the information includes a request to send (RTS) frame.

Upon receipt of the information transmitted (302), device 104 may determine one or more channel characteristics (e.g., channel state information (CSI)) observed when receiving the transmitted information, block 304. According to one example embodiment, the channel characteristics may include any one or more of observed radio frequency (RF) signal characteristics (SNR, SINR, RSSI, fading characteristics, etc.) of the channel (106) and/or channel quality performance characteristics (BER, PER, FER, SER, etc.) associated with the decoded content received via the channel. The determination of the one or more channel characteristics may well be performed in accordance with a conventional operation of receiver (206), or may well be performed by one or more element(s) of SMA (118) of device 104.

In element 306 SMA 202 calculates a bit loading and power distribution. According to one embodiment, SMA 202 invokes an instance of BPL calculator to determine the bit loading and power distribution. In this regard, according to one example embodiment, for a given number of subcarriers $N_{SC}$ (e.g., 48), and a given set of RATEs (RATE={RATE$_1$, ..., RATE$_M$}), the set of subcarrier signal to noise (SNR) thresholds in $g_{RATE}=\{g_{RATE_1}, ..., g_{RATE_M}\}$ may be pre-defined and ranked in ascending order. As used herein, $g_{RATE_k}$ is the SNR threshold value for the $k^{th}$ type of RATE combination (modulation and encoding), where it is assumed that there is only additive white Gaussian noise (AWGN) in each subcarrier. For example, in the IEEE 802.11a communication model, the threshold value $g_{RATE1}$ is calculated for BPSK (lowest order modulation) with a coding rate of R=½ (lowest order coding).

According to one example embodiment, SMA 202 determines whether the SNR per subcarrier $$\left(e.g., \gamma_i = \frac{\lambda_i P_i}{\sigma^2_{n,i}}\right)$$

is equal to the threshold value $g_{RATE_k}$, such that the required channel quality performance threshold (e.g., BER) is achieved for the $k^{th}$ type of RATE combination. By using channel characteristics, an effective noise power in each subcarrier can be determined as:

$$\sigma^2_i = \frac{\sigma^2_{n,i}}{\lambda_i}$$

(again, where $\sigma^2_i$, is the subcarrier noise power in the $i^{th}$ subcarrier, and $\lambda_i$ is the subcarrier power gain associated with the channel transfer function for the $i^{th}$ subcarrier).

SMA 202 begins the initial water-filling stage by sorting the $N_{SC}$ subcarriers in, e.g., ascending order of effective noise power ($\sigma_i^2$), where: $\sigma_1^2=\sigma_{min}^2$ and $\sigma_{N_{SC}}^2=\sigma_{MAX}^2$. According to one example embodiment, the sorted subcarriers are placed by SMA 202 control logic in an index table created in memory. In this regard, SMA 202 maintains an order and understanding of the allocation of the subcarriers within the spectrum.

Once the subcarriers have been sorted, SMA 202 identifies the bad (turned-off) subcarriers. According to one embodiment, subcarriers with SNR $\gamma_i$ less than threshold $g_{RATE_1}$ (associated with the lowest RATE combination of modulation plus encoding) will be turned off. In this regard, according to one embodiment, SMA 202 may set $N_{on}$ equal to the total number of subcarriers $N_{SC}$, and then determines an adaptive level A, e.g., in accordance with equation 1:

$$A = \frac{1}{N_{on}} \left( P_{total} + \sum_{i=1}^{N_{on}} \sigma_i^2 \right) \quad [1]$$

If the adaptive level for the subcarrier satisfies $A < (g_{RATE1} + 1)\sigma_{N_{on}}^2$, which is equivalent to SNR $\gamma_i$ less than threshold $g_{RATE1}$, the $N_{on}^{th}$ subcarrier is identified as a "bad" subcarrier, and is turned off. SMA 202 then proceeds to the next subcarrier in the index list, and the adaptive level (A) for the next subcarrier is calculated. The process continues until the measured adaptive level for a subcarrier in the list exceeds the performance metric threshold, i.e., $A \geq (g_{RATE1}+1)\sigma_{N_{on}}^2$, as this denotes the subcarrier threshold in the index for "good" subcarriers, i.e., where the performance metric SNR $\gamma_i$ is greater than threshold $g_{RATE1}$, and the BER can be guaranteed for the subcarrier.

Once the active subcarriers have been identified, SMA 202 sets the initial power distribution among the subcarriers for transmission. In accordance with traditional water-filling principles, the power is evenly distributed across the active subcarriers, while the deactivated subcarriers are turned off, mathematically expressed according to the following equation:

$$P_i^{WF} = \begin{cases} A - \sigma_i^2, & i = 1 \ldots N_{on} \\ 0, & i = (N_{on}+1) \ldots N_{SC} \end{cases} \quad [2]$$

At which point, SMA 202 has defined that ordered subcarriers with numbers $i=1 \ldots N_{on}$ are active (good), while subcarriers with numbers $i=(N_{on}+1) \ldots N_{sc}$, which fail to meet the guaranteed performance metric (bad subcarriers) are deactivated in accordance with water-filling principles. The initial power distribution is graphically illustrated with reference to FIG. 4.

To complete BPL calculations SMA 202 identifies bit loading and final power distribution among the subcarriers, even reactivating at least a subset of the subcarriers that were initially deactivated during the water-filling procedure, block 308. SMA 202 begins this adjustment by finding the maximum rate ($RATE_m$) for which the threshold $G_{RATEm}$ is equal to or less than the "best" subcarrier performance metric (e.g., SNR $\gamma_1$), mathematically expressed as:

$$g_{RATEm} \leq \gamma_1 = \frac{P_1^{WF}}{\sigma_1^2} \quad [3]$$

According to one example embodiment, $RATE_m$ is the maximum RATE, which will be used for subcarriers with the highest channel power gains.

Once the maximum available rate ($RATE_m$) is identified, SMA 202 determines the maximum number of subcarriers suitable for processing at that identified rate, denoted herein as $N_{RATEm}$. According to one example embodiment, SMA 202 identifies the maximum number of subcarriers suitable for processing at the identified $RATE_m$ ($N_{RATEm}$) for which the following inequality is satisfied:

$$\gamma_{RATEm}^{ITPC} = \frac{\sum_{i=1}^{N_{RATEm}} P_i^{WF}}{\sum_{i=1}^{N_{RATEm}} \sigma_i^2} \geq g_{RATEm} \quad [4]$$

On the left side of the inequality is an analytical expression for the performance metric (e.g., SNR per subcarrier) at the receiver side. According to one example embodiment, the analytical expression presumes that pre-equalization in accordance with some intelligent transmit power control (ITPC) is used for given subcarriers subset $i=1 \ldots N_{RATEm}$ at the transmit side.

According to one example embodiment, an adaptive intelligent transmitted power control scheme suitable for OFDM may be used, such as the one introduced in co-pending application No. 10/330,675 entitled "*SYSTEM AND METHOD FOR INTELLIGENT TRANSMITTED POWER CONTROL SCHEME*", filed Dec. 30, 2002 by Sadri, et al and commonly owned by the assignee of the present invention, the disclosure of which is incorporated by reference herein for all purposes. It has been shown that the pre-equalization procedure introduced therein reduces BER for given total power in a subset. Thus, calculating the number of subcarriers $N_{RATEm}$ is performed taking into account SNR pre-equalization.

Accordingly, SMA 202 sets $RATE_m$ ($m^{th}$ combination of modulation plus encoding) for subcarriers subset $i=1 \ldots N_{RATEm}$. SMA 202 then sets the power distribution at the transmit side $$P_i^{OPT} = g_{RATEm} \cdot \sigma_i^2,$$

($i=1 \ldots N_{RATEm}$) for this subcarrier subset. It is necessary to underline that for such power allocation at the transmit side, all subcarriers of this subset will have equal performance characteristics (e.g., $$SNRs \, \gamma_i^{OPT} = g_{RATEm}$$

at the receive side, and will have performance metrics (e.g., BER) equal to the target, fixed, performance metric.

According to one example embodiment, to meet regulatory power requirements, SMA 202 may compare the transmit power distribution against a regulatory threshold, e.g., $$P_i^{OPT} \leq P_{threshold}^{Govt\_agency}.$$

If the foregoing inequality is not valid for some subcarrier, SMA 202 selectively excludes the subcarrier from the $RATE_m$ subcarrier subset. For this subcarrier, a lower order $RATE$ ($RATE_{m-1}$) may be used.

Once SMA 202 identifies the power distribution for the subset, it may calculate the total power of the subset as $$P_{RATEm}^{opt} = \sum_{i=1}^{N_{RATEm}} P_i^{opt},$$

providing a given performance threshold (e.g., BER). Extra power, $$P_m^{EXTRA},$$

is identified as the difference between a total power of the initial water-filling solution for the given subset and the obtained power $$P_{RATEm}^{opt},$$

e.g., in accordance with equation 5, below.

$$P_m^{EXTRA} = \sum_{i=1}^{N_{RATEm}} P_i^{WF} - \sum_{i=1}^{N_{RATEm}} P_i^{opt} \qquad [5]$$

According to one embodiment, this extra power appears because of discrete types of modulation and encoding. It is not sufficient to increase the number of subcarriers in a vacuum, without addressing power allocation. At the same time this power is extra in the sense that any power over and above what is minimally required to achieve the given performance metric (e.g., BER) by each subcarrier in a subset is "wasted", and more appropriately applied to other subcarriers or to the reactivation of previously deactivated subcarrier(s).

According to one embodiment, SMA 202 iteratively reallocates the identified extra power in remaining, lower order subsets. According to one example embodiment, SMA 202 may find the maximum number of subcarriers in the next lower-order RATE subset (i.e., $RATE_{m-1}$) as:

$$\gamma_{RATE_{m-1}}^{ITPC} = \frac{P_m^{EXTRA} + \sum_{i=N_{RATEm}+1}^{N_{RATEm-1}} P_i^{WF}}{\sum_{i=N_{RATEm}+1}^{N_{RATEm-1}} \sigma_i^2} \geq g_{RATE_{m-1}} \qquad [6]$$

If this inequality is not valid for any $N_{RATEm-1}$, then $RATE_{m-1}$ must be passed and SMA 202 moves to the next subset, $RATE_{m-2}$, or to the following rate.

SMA 202 then sets $RATE_{m-1}$, i.e., the $(m-1)^{th}$ modulation and encoding type, for subset of subcarriers with indexes $i=\{N_{RATEm}+1, \ldots, N_{RATEm-1}\}$. Then, SMA 202 sets the power distribution at the transmit side equal to $$P_i^{opt} = g_{RATEm-1} \cdot \sigma_i^2,$$

for this subcarrier subset. For such power allocation at the transmit side will have uniform SNRs $\gamma_i = g_{RATEm-1}$, and uniform performance metric (e.g., BER) equal to the target performance metric. Obtained power allocation enables SMA 202 to calculate the total power of this subset, as above, as $$P_{RATE_{m-1}}^{opt} = \sum_{i=N_{RATEm}+1}^{N_{RATEm-1}} P_i^{opt}.$$

In view of this determination of total power, SMA 202 may update the value of extra power available (a cumulative sum), as:

$$P_{m-1}^{EXTRA} = P_m^{EXTRA} + \left( \sum_{i=N_{RATEm}+1}^{N_{RATEm-1}} P_i^{WF} - \sum_{i=N_{RATEm}+1}^{N_{RATEm-1}} P_i^{opt} \right) \qquad [7]$$

This process may be iteratively repeated up to $RATE_1$ subset, or up to a case when all subcarriers will be active for current $RATE_l$ (i.e., $N_{RATEl}=N_{sc}$). In the last case SNRs in all subcarriers rather than high and using RATEs for $1 \leq k \leq l-1$ is not rational for throughput maximization.

Once a bit loading and final power distribution has been identified, SMA 202 may transmit (310) the proposed bit loading and power distribution to the remote device for use in subsequent channel processing. In block 312, the remote device receives and selectively applies the proposed bit loading and power distribution during subsequent channel processing of the communication channel between the devices.

Those skilled in the art will appreciate that in so doing, SMA 202 obtains bit allocations (modulations plus encoding combinations) and power distributions for all subcarriers. These bit allocations and power distributions serve to increase (or, maximize) a total data rate and guarantees that the performance metric is equal to a given performance value (e.g., $BER=10^{-5}$). At the end of this process, the initial number of active subcarriers $N_{on}$ can only increase, as the initial choice of last active subcarriers have guaranteed validation of the inequality $$\gamma_{N_{on}} \leq g_{RATE1}.$$

Figure 5:
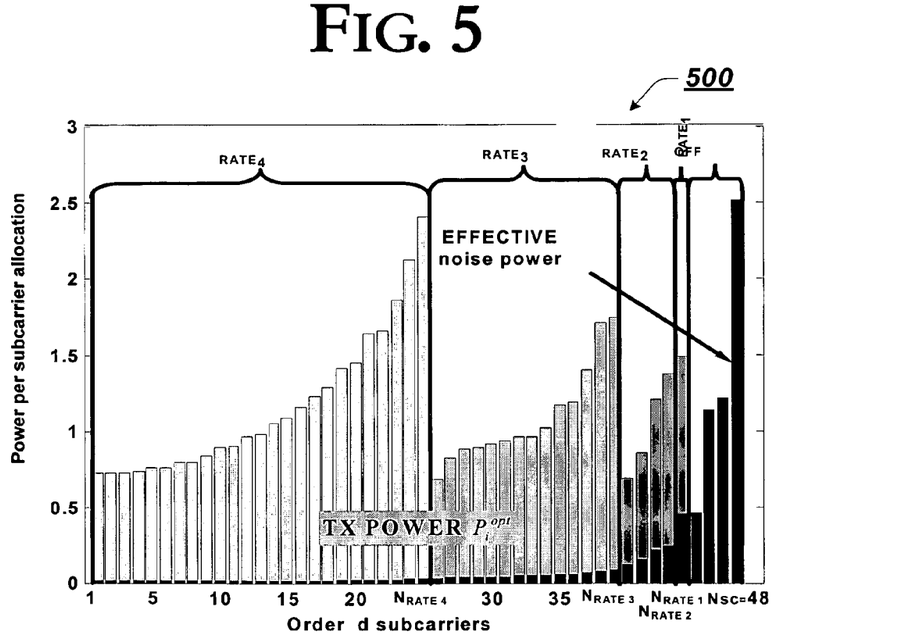

Also, the number of active subcarriers can be increased by "transfusion" of saved powers $$P_k^{EXTRA}$$

from higher order subsets to lower order subsets. The redistribution of bit loading and power distribution is graphically depicted in FIG. 5.

According to one embodiment, the extra power $P_l^{EXTRA}$ which remains after the formation of the last subset may be allocated over all active subcarriers, which may serve to improve performance (e.g., lower the BER experienced at the receiver) on those subcarriers. In another embodiment, SMA 202 may not use the identified extra power $P_i^{EXTRA}$, achieving the required performance metric while reducing (or saving) power (i.e., a power safe mode).

Figure 4:
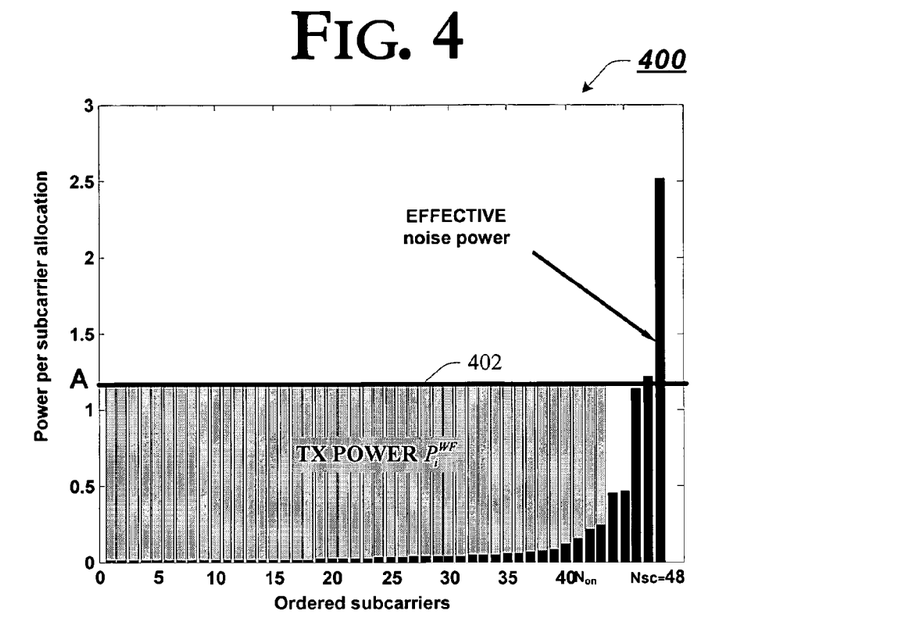
FIGS. 4 and 5 provide graphical illustrations of the bit loading and power distribution among a plurality of subcarriers, according to one embodiment of the invention.

As introduced above, FIGS. 4 and 5 provide graphical illustrations of power allocation at various stages of adaptive bit and power loading, according to one example embodiment of the invention. Turning briefly to FIG. 4, a spectrum diagram of a number of subcarriers of a multicarrier wireless communication channel is depicted. More particularly, diagram 400 graphically depicts a spectrum diagram of a plurality of active subcarriers having been processed in accordance with the initial water-filling techniques employed by SMA 202, described above. As shown, SMA 202 identifies good subcarriers ($N_{on}$) 1-43, wherein bit loading and power distribution is evenly allocated among the active subcarriers. The remaining subcarriers (i.e., bad subcarriers with SNR $\gamma_i$ less than threshold $g_{RATE1}$) are deactivated.

In FIG. 5, a graphical illustration of the subcarriers of the wireless communication channel after the final bit loading and power distribution by the SMA 202, according to the teachings of the present invention. More particularly, FIG. 5 illustrates the power per subcarrier allocation for a given channel realization and a given set of RATEs. According to one example embodiment, the $RATE_4$ represents 64 QAM, R=½; $RATE_3$ represents 16 QAM, R=½; $RATE_2$ represents QPSK, R=½; and $RATE_1$ represents BPSK and R=½. As shown, the number of active subcarriers increased from 43 (see FIG. 4) to 44. A graphical illustration of the increased throughput is presented with reference to FIG. 6.

Figure 6:
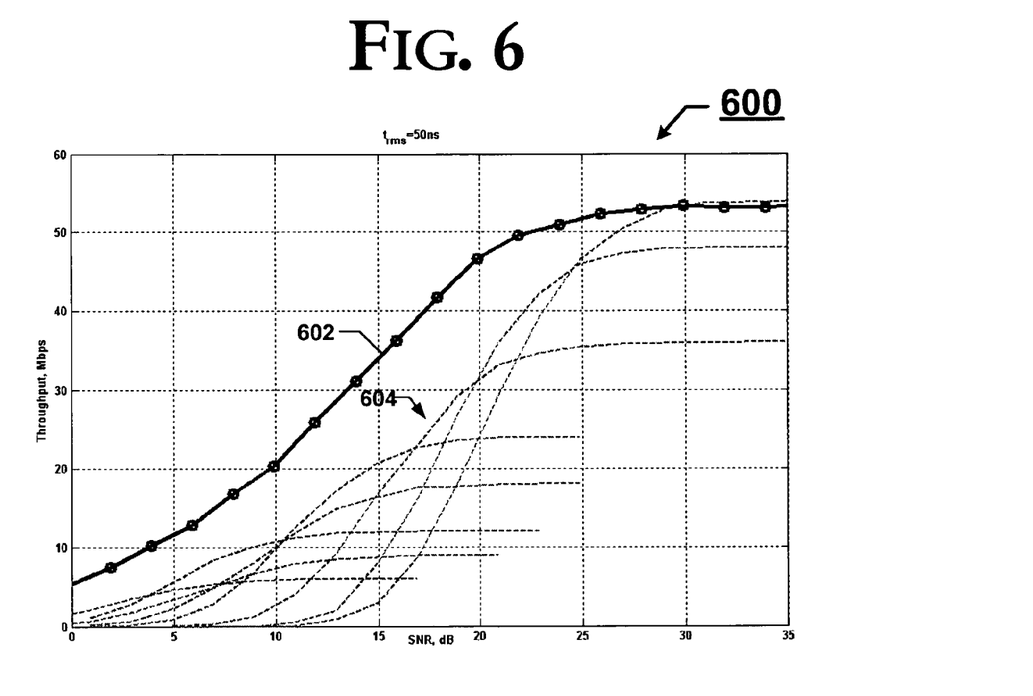
FIG. 6 is a graphical illustration evidencing the improvement realized by use of subcarrier management agent, according to one example implementation of the present invention.

FIG. 6 is a graphical illustration evidencing the improvement in channel throughput realized through use of the bit and power loading agent, according to one example implementation of the present invention. To illustrate the improvement gained through the adaptive bit loading and power distribution implemented by SMA 202, a graphical comparison of the total throughput for the SMA bit loading and power distribution (602) is depicted in relation to that for a conventional OFDM system (604). As shown, the adaptive bit loading and power distribution implemented by SMA 202 exhibits a 4-5 decibel (dB) gain in SNR compared to the traditional OFDM system.

Thus, in contrast to the conventional "water-filling" approaches to bit and power loading among the various subcarriers of the multicarrier channel, the subcarrier management agent (SMA) introduced herein increases the effective throughput of a multicarrier communication channel by allocating, and subsequently readjusting the power allocation and bit loading among the subcarriers in a multicarrier channel to increase throughput while preserving or improving one or more channel quality parameters. According to one example embodiment, the SMA dynamically adjusts the bit/power budget among the subcarrier(s), or groups of subcarriers, to effectively meet a given threshold associated, for example, with a channel quality metric such as, e.g., bit-error rate (BER), packet-error rate (PER), signal-to-noise ratio (SNR), signal-to-interference and noise ratio (SINR), receive power level, and the like.

Alternate Embodiment(s)

Figure 7:
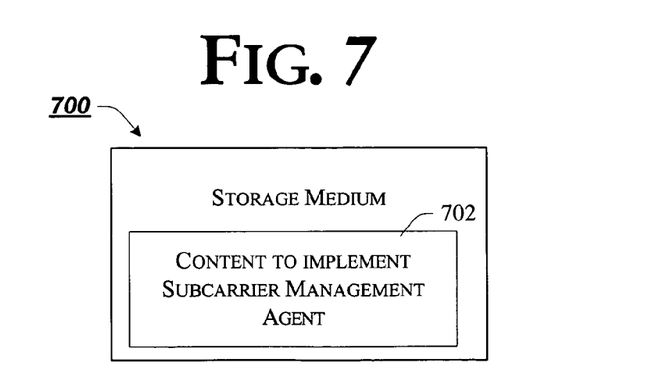
FIG. 7 is a block diagram of an example article of manufacture including content which, when executed by an accessing machine, causes the machine to implement one or more aspects of embodiment(s) of the invention.

FIG. 7 illustrates a block diagram of an example storage medium comprising content which, when invoked, may cause an accessing machine to implement one or more aspects of the subcarrier management agent 200 and/or associated methods 300. In this regard, storage medium 700 includes content 702 (e.g., instructions, data, or any combination thereof) which, when executed, causes an accessing appliance to implement one or more aspects of SMA 200, described above.

The machine-readable (storage) medium 700 may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem, radio or network connection).

It should be understood that embodiments of the present invention may be used in a variety of applications. Although the present invention is not limited in this respect, the circuits disclosed herein may be used in many apparatuses such as in the transmitters and receivers of a radio system. Radio systems intended to be included within the scope of the present invention include, by way of example only, wireless local area networks (WLAN) devices and wireless wide area network (WWAN) devices including wireless network interface devices and network interface cards (NICs), base stations, access points (APs), gateways, bridges, hubs, cellular radiotelephone communication systems, satellite communication systems, two-way radio communication systems, one-way pagers, two-way pagers, personal communication systems (PCS), personal computers (PCs), personal digital assistants (PDAs), sensor networks, personal area networks (PANs) and the like, although the scope of the invention is not limited in this respect.

Types of wireless communication systems intended to be within the scope of the present invention include, although not limited to, Wireless Local Area Network (WLAN), Wireless Wide Area Network (WWAN), Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, and the like, although the scope of the invention is not limited in this respect.

Embodiments of the present invention may also be included in integrated circuit blocks referred to as core memory, cache memory, or other types of memory that store electronic instructions to be executed by the microprocessor or store data that may be used in arithmetic operations. In general, an embodiment using multistage domino logic in accordance with the claimed subject matter may provide a benefit to microprocessors, and in particular, may be incorporated into an address decoder for a memory device. Note that the embodiments may be integrated into radio systems or hand-held portable devices, especially when devices depend on reduced power consumption. Thus, laptop computers, cellular radiotelephone communication systems, two-way radio communication systems, one-way pagers, two-way pagers, personal communication systems (PCS), personal digital assistants (PDA's), cameras and other products are intended to be included within the scope of the present invention.

The present invention includes various operations. The operations of the present invention may be performed by hardware components, such as those shown in FIG. 1 and/or 2, or may be embodied in machine-executable content (e.g., instructions) 702, which may be used to cause a general-purpose or special-purpose processor or logic circuits programmed with the instructions to perform the operations. Alternatively, the operations may be performed by a combination of hardware and software. Moreover, although the invention has been described in the context of a computing appliance, those skilled in the art will appreciate that such functionality may well be embodied in any of number of alternate embodiments such as, for example, integrated within a communication appliance (e.g., a cellular telephone).

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Any number of variations of the inventive concept are anticipated within the scope and spirit of the present invention. In this regard, the particular illustrated example embodiments are not provided to limit the invention but merely to illustrate it. Thus, the scope of the present invention is not to be determined by the specific examples provided above but only by the plain language of the following claims.

What is claimed is:

1. A method comprising:
    receiving channel state information associated with a multicarrier wireless communication channel having a plurality of subcarriers, wherein the channel is processed to identify active subcarriers and initial power distribution among the subcarriers; and
    selecting a bit loading and final power distribution for use in subsequent processing of the subcarriers of the communication channel based, at least in part, on the received channel state information, wherein the bit loading and final power distribution increases channel throughput while guaranteeing a channel quality metric among active subcarriers;
    wherein selecting a bit loading and final power distribution includes:
        identifying among the active subcarriers, those which exceed a channel quality performance threshold, said identified subcarriers forming a highest rate subset of subcarriers;
        calculating an excess power value by determining how much power could be reduced in the identified subcarriers, from the initial power distribution, so that they still meet, but do not exceed, the channel quality performance threshold; and
        reallocating at least a portion of the excess power from the highest-rate subset of subcarriers to one or more lower-rate subsets of subcarriers.

2. A method according to claim 1, wherein identification of active subcarriers and power distribution in the multicarrier wireless communication channel was initially established using a water-filling technique.

3. A method according to claim 2, the water-filling technique comprising:
    sorting the subcarriers according to a channel performance metric;
    identifying as a threshold among the sorted subcarriers a subcarrier that fails to meet the channel performance metric, wherein the subcarriers above or below the threshold are identified as bad subcarriers;
    deactivating the bad subcarriers; and
    distributing the available power among active subcarriers of the communication channel.

4. A method according to claim 3, wherein the channel state information is received from a remote device.

5. A method according to claim 4, the channel state information comprising one or more channel processing parameters including bit loading, coding type, modulation type and power allocation, determined by the remote device.

6. A method according to claim 4, wherein the channel state information is representative of one or more of channel performance characteristics and channel quality characteristics.

7. A method according to claim 6, wherein the channel performance characteristics include radio frequency (RF) characteristics comprising one or more of a received signal strength indication (RSSI), a signal to noise ratio (SNR), a signal to interference and noise ratio (SINR), fading characteristic(s), and Doppler characteristics.

8. A method according to claim 6, wherein the channel quality characteristics include one or more of a bit-error rate (BER), a packet-error rate (PER), a symbol-error rate (SER), and a frame error rate (FER).

9. A method according to claim 1, wherein reallocating comprises applying the excess power to deactivated subcarriers in lower-rate subsets to increase a number of active subcarriers and channel throughput.

10. A method according to claim 1, further comprising:
    modifying at least a subset of initial power coefficients to reactivate one or more subcarriers which were initially deactivated.

11. A method according to claim 3, wherein the channel state information is received from a local receiver and is representative of an estimate of a channel transfer function.

12. A method according to claim 11, wherein the channel transfer function is one or more of channel transfer function estimate in the frequency domain and a channel transfer function estimate in the time domain based on receipt of a wireless signal transmitted from a remote device.

13. A method according to claim 1, the element of selecting a bit loading and final power distribution comprising:
    after reallocating:
        second identifying among the active subcarriers, those which exceed a second channel quality performance threshold but which are not within said highest rate subset of subcarriers, said second identified subcarriers forming a next highest rate subset of subcarriers;
        second calculating an excess power value by determining how much power could be reduced in the second identified subcarriers so that they still meet, but do not exceed, the second channel quality performance threshold; and
        updating the original excess power value based on the excess power associated with the second identified subcarriers.

14. A method according to claim 13, further comprising:
    after updating:
        third identifying among the active subcarriers, those which exceed a third channel quality performance threshold but which are not within said highest or next highest rate subset of subcarriers, said third identified subcarriers forming a third highest rate subset of subcarriers;
        third calculating an excess power value by determining how much power could be reduced in the third identified subcarriers so that they still meet, but do not exceed, the third channel quality performance threshold; and second updating the original excess power value based on the excess power associated with the third identified subcarriers.

15. A method according to claim 1, further comprising:
issuing a message to a remote transmitter to apply the bit loading and final power distribution to subsequent processing of the multicarrier communication channel.

16. A computer readable storage medium comprising content which, when executed by an accessing device, causes the device to implement a method according to claim 1.

17. An apparatus comprising:
a transceiver, to establish a multicarrier communication channel with a remote transceiver; and
a subcarrier management agent (SMA), coupled with the transceiver, to receive channel state information associated with a multicarrier wireless communication channel having a plurality of subcarriers, wherein the channel is processed to identify active subcarriers and initial power distribution among the subcarriers, and to select a bit loading and final power distribution for use in subsequent processing of the subcarriers of the communication channel based, at least in part, on the received channel state information, wherein the bit loading and final power distribution increases channel throughput while guaranteeing a channel quality metric among active subcarriers;
wherein the SMA identifies, among the active subcarriers, those which exceed a channel quality performance threshold, calculates how much power could be reduced in the identified subcarriers, from the initial power distribution, so that they still meet, but do not exceed, the channel quality performance threshold to identify an excess power level, and reallocates at least a portion of the excess power from a higher-rate subset of subcarriers to one or more lower-rate subsets of subcarriers.

18. An apparatus according to claim 17, wherein the SMA employs a water-filling technique to identify active subcarriers and initial power distribution in the multicarrier wireless communication channel.

19. An apparatus according to claim 18, wherein the SMA sorts the subcarriers according to a channel performance metric, identifies as a threshold among the sorted subcarriers a subcarrier that fails to meet the channel performance metric, wherein the subcarriers above or below the threshold are identified as bad subcarriers, deactivates the identified bad subcarriers, and distributes the available power among active subcarriers of the communication channel.

20. An apparatus according to claim 19, the channel state information comprising one or more channel processing parameters including bit loading, coding type, modulation type and power allocation, determined by the remote device.

21. An apparatus according to claim 19, wherein the channel state information is representative of one or more of channel performance characteristics and channel quality characteristics.

22. An apparatus according to claim 21, wherein the channel performance characteristics include radio frequency (RF) characteristics comprising one or more of a received signal strength indication (RSSI), a signal to noise ratio (SNR), a signal to interference and noise ratio (SINR), fading characteristic(s), and Doppler characteristics.

23. An apparatus according to claim 21, wherein the channel quality characteristics include one or more of a bit-error rate (BER), a packet-error rate (PER), a symbol-error rate (SER), and a frame error rate (FER).

24. An apparatus according to claim 17, wherein the SMA selectively reallocates at least a portion of the excess power value identified in one or more higher-rate subsets to deactivated subcarriers in lower-rate subsets to increase a number of active subcarriers, and channel throughput.

25. An apparatus according to claim 24, wherein the SMA dynamically generates updated power coefficients to replace at least a subset of initial power coefficients, and selectively applies the updated coefficients to a weighting element of the transmitter.

26. An apparatus according to claim 17, wherein the SMA dynamically generates control content comprising one or more of a bit distribution mask, a coding type, a modulation and power allocation coefficients for application to one or more elements of the transceiver.

27. A system comprising:
one or more dipole antennas;
a transceiver, selectively coupled to one or more of the antenna(e), to establish a multicarrier communication channel with a remote transceiver; and
a subcarrier management agent (SMA), coupled with the transceiver, to receive channel state information associated with a multicarrier wireless communication channel having a plurality of subcarriers, wherein the channel is processed to identify active subcarriers and initial power distribution among the subcarriers, and to select a bit loading and final power distribution for use in subsequent processing of the subcarriers of the communication channel based, at least in part, on the received channel state information, wherein the bit loading and final power distribution increases channel throughput while guaranteeing a channel quality metric among active subcarriers;
wherein the SMA identifies, among the active subcarriers, those which exceed a channel quality performance threshold, calculates how much power could be reduced in the identified subcarriers, from the initial power distribution, so that they still meet, but do not exceed, the channel quality performance threshold to identify an excess power level, and reallocates at least a portion of the excess power from a higher-rate subset of subcarriers to one or more lower-rate subsets of subcarriers.

28. A system according to claim 27, wherein the SMA employs a water-filling technique to identify active subcarriers and initial power distribution in the multicarrier wireless communication channel.

29. A system according to claim 27, the channel state information comprising one or more channel processing parameters including bit loading, coding type, modulation type and power allocation, determined by the remote device.

30. A system according to claim 27, wherein the channel state information is representative of one or more of channel performance characteristics and channel quality characteristics.

31. A system according to claim 30, wherein the channel performance characteristics include radio frequency (RF) characteristics comprising one or more of a received signal strength indication (RSSI), a signal to noise ratio (SNR), a signal to interference and noise ratio (SINR), fading characteristic(s), and Doppler characteristics.

32. A system according to claim 30, wherein the channel quality characteristics include one or more of a bit-error rate (BER), a packet-error rate (PER), a symbol-error rate (SER), and a frame error rate (FER).

33. A system according to claim 27, wherein the SMA selectively applies at least a subset of the excess power value identified in one or more higher-rate subsets to deactivated subcarriers in lower-rate subsets to increase a number of active subcarriers, and channel throughput.

34. A computer readable storage medium comprising content which, when executed by an accessing device, enables the device to selectively receive channel state information associated with a multicarrier wireless communication channel having a plurality of subcarriers, wherein the channel is processed to identify active subcarriers and initial power distribution among the subcarriers, and to select a bit loading and final power distribution for use in subsequent processing of the subcarriers of the communication channel based, at least in part, on the received channel state information, wherein the bit loading and final power distribution increases channel throughput while guaranteeing a channel quality metric among active subcarriers, wherein selection of a bit loading and final power distribution includes: operation to identify among the active subcarriers, those which exceed a channel quality performance threshold; operation to calculate an excess power value by determining how much power could be reduced in the identified subcarriers, from the initial power distribution, so that they still meet, but do not exceed, the channel quality performance threshold; and operation to reallocate at least a portion of the excess power from a higher-rate subset of subcarriers to one or more lower-rate subsets of sub carriers.

35. A storage medium according to claim 34, further comprising content which, when executed causes the accessing device to implement a water-filling technique to identify active subcarriers and initial power distribution in the multicarrier wireless communication channel.

36. A storage medium according to claim 34, wherein said operation to reallocate comprises applying the excess power to deactivated subcarriers in lower-rate subsets to increase a number of active subcarriers, and channel throughput.

* * * * *